D. K. ALLISON.
PAN SKIP DEVICE FOR CRACKER CUTTING MACHINES.
APPLICATION FILED APR. 1, 1918.

1,292,985.

Patented Feb. 4, 1919.
4 SHEETS—SHEET 1.

Inventor
Daniel K. Allison

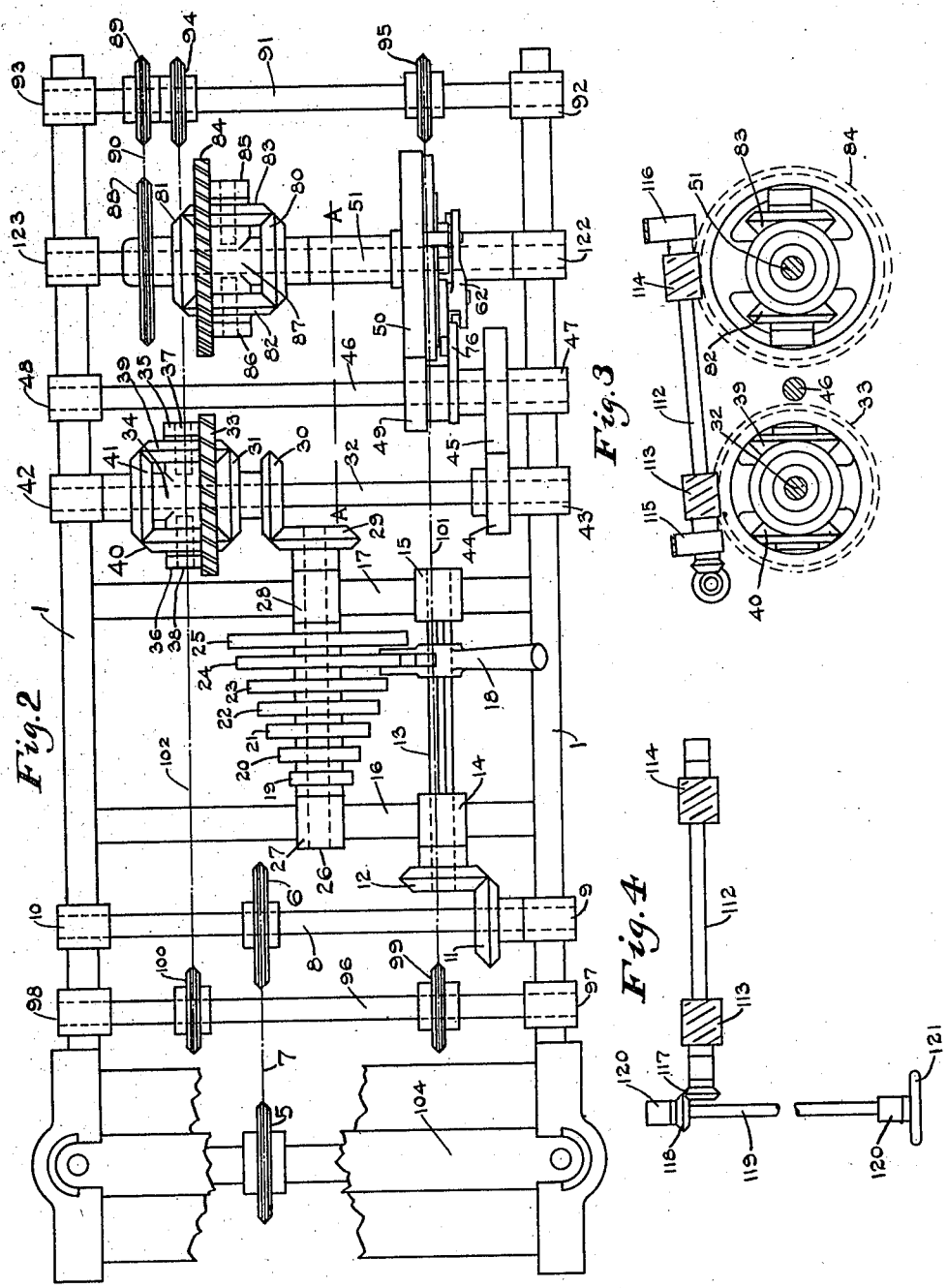

D. K. ALLISON.
PAN SKIP DEVICE FOR CRACKER CUTTING-MACHINES.
APPLICATION FILED APR. 1, 1918.

1,292,985.

Patented Feb. 4, 1919.
4 SHEETS—SHEET 3.

Inventor
Daniel K. Allison

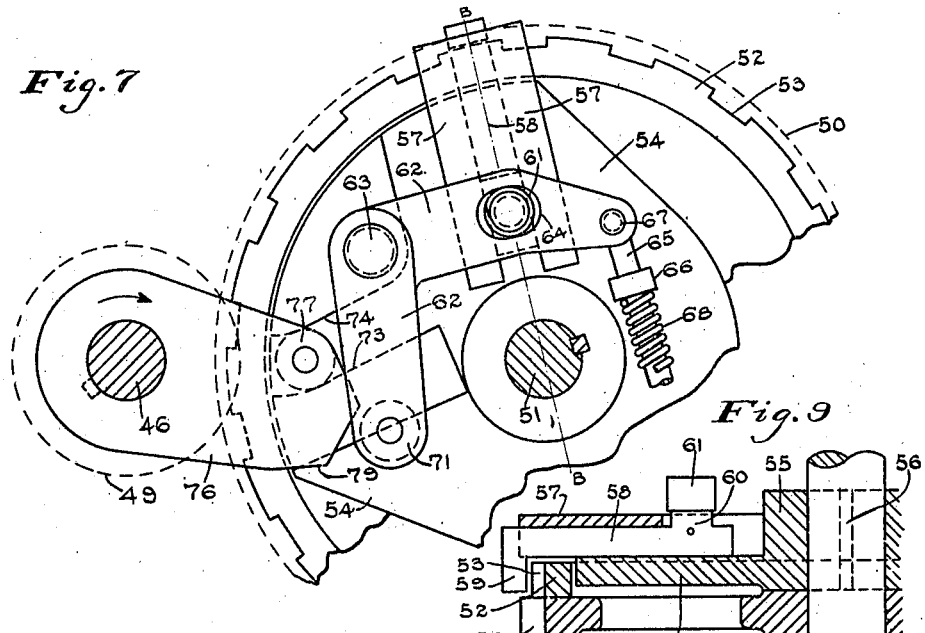
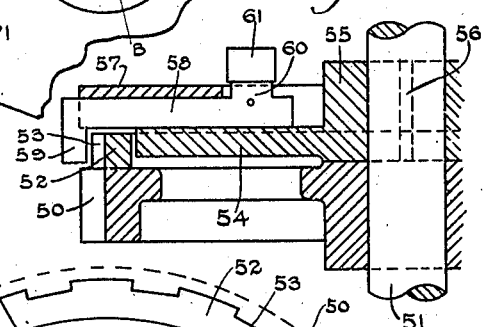
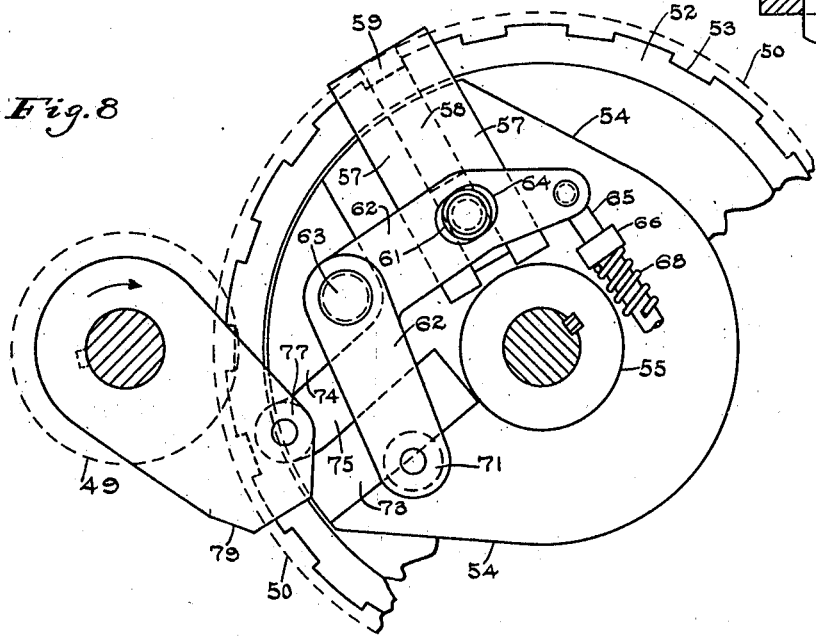

UNITED STATES PATENT OFFICE.

DANIEL K. ALLISON, OF CINCINNATI, OHIO, ASSIGNOR TO THE J. H. DAY COMPANY, OF CINCINNATI, OHIO, A CORPORATION OF OHIO.

PAN-SKIP DEVICE FOR CRACKER-CUTTING MACHINES.

1,292,985.  Specification of Letters Patent.  Patented Feb. 4, 1919.

Application filed April 1, 1918. Serial No. 226,012.

*To all whom it may concern:*

Be it known that I, DANIEL K. ALLISON, a citizen of the United States, residing at Cincinnati, in the county of Hamilton and State of Ohio, have invented certain new and useful Improvements in Pan-Skip Devices for Cracker-Cutting Machines, of which the following is a specification.

My invention relates to that type of devices which are applicable to pan skips of cracker cutting machines and its object is to provide a pan skipping device which shall be positive in its operation and when applied to pan delivery conveyers of cracker cutting machines will cause them to skip in proper register with coöperating parts thereof.

Figure 1:
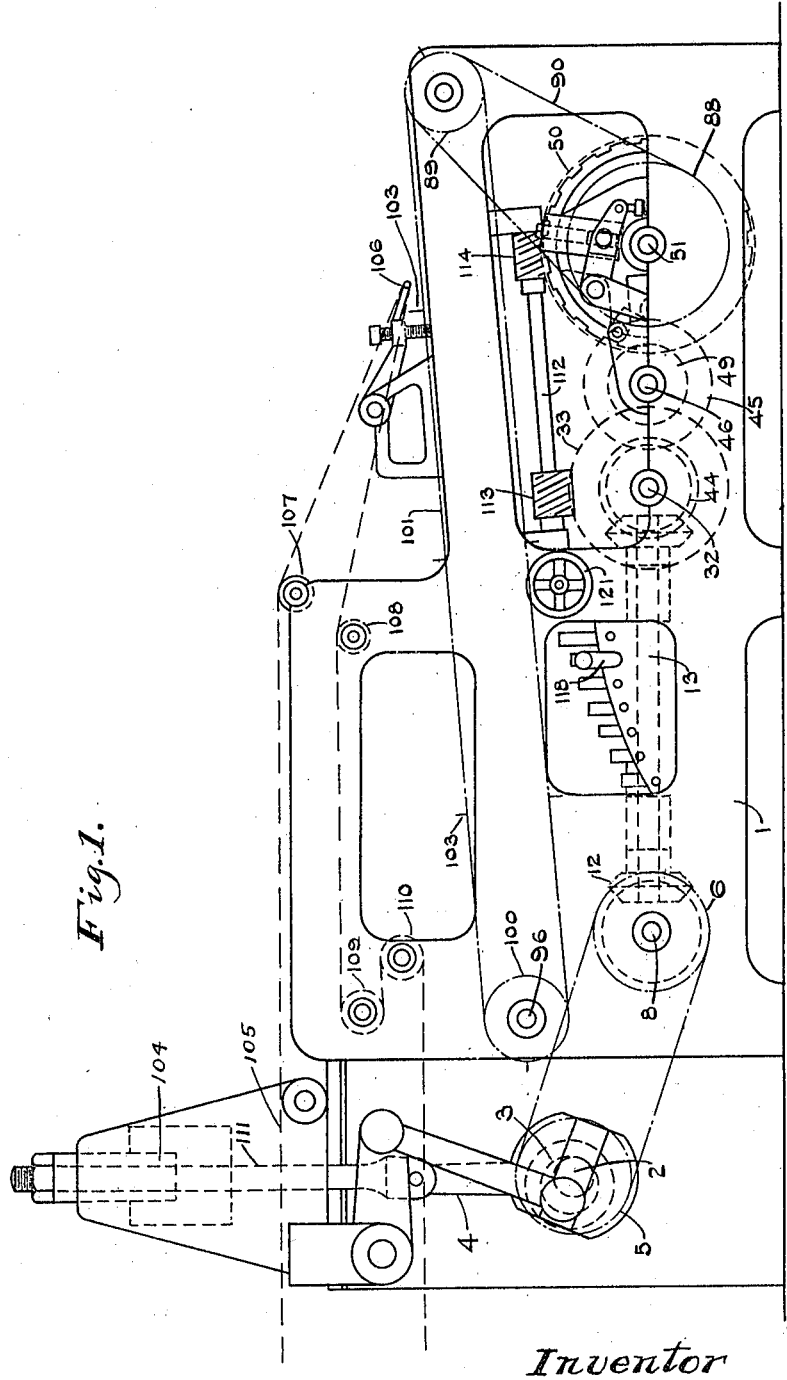
Figure 5:
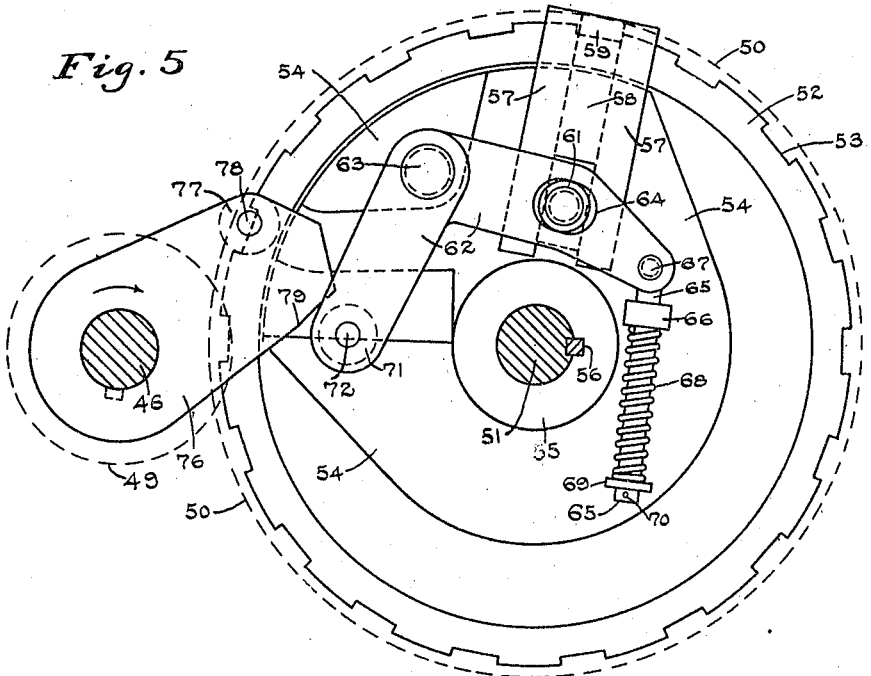
Figure 6:
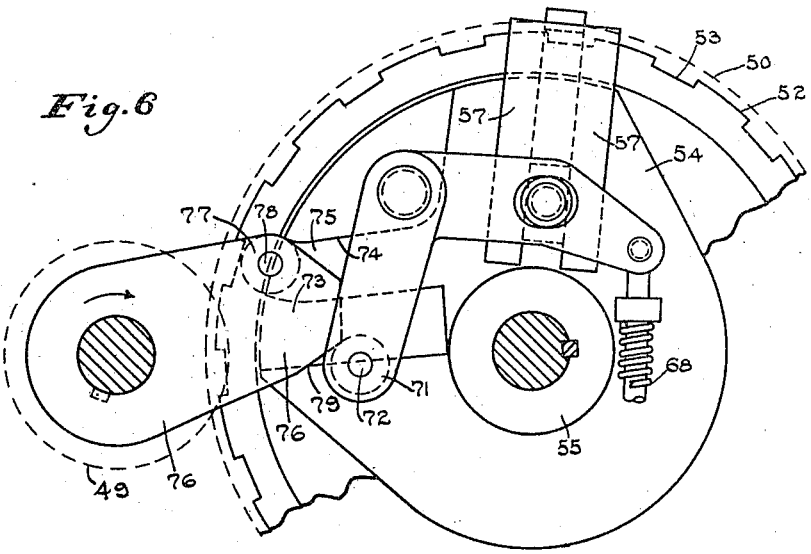

In the accompanying drawings Figure 1 is a side elevation of the pan delivery portion of a cracker cutting machine; Fig. 2 is a plan view of the same; Fig. 3 is a detail assembly of the worm wheels 33 and 84 and worms 113 and 114 and connecting mechanisms; Fig. 4 is a plan view of shafts 112 and 119; Fig. 5 is a detail elevation of gear 50 and pinion 49 and parts coöperating therewith to form the pan skipping mechanism. Fig. 6 is a similar view of the same parts showing a change in position. Figs. 7 and 8 are similar views to 5 and 6 showing still further changes in position. Fig. 9 is a sectional view through Fig. 7 taken along the line B—B.

The machine is mounted within the side frame 1—1. The crank shaft 2 is connected to the cutter head 104 by the eccentrics 3—3 and connecting rods 4—4 and bars 111. Securely keyed to crank shaft 2 is the sprocket wheel 5 which drives sprocket wheel 6 by chain 7. Said sprocket wheel 6 is securely keyed to transverse shaft 8 which is journaled in bearings 9 and 10. The bevel gear 11 is also keyed to shaft 8 and meshes in and drives bevel gear 12 which is securely keyed to longitudinal shaft 13. Said shaft 13 is journaled in bearings 14 and 15 located in the cross frames 16 and 17.

The tumbler gear device 18 is well known in the mechanical arts and is used to furnish gear connection between the shaft 13 and any one of the gears 19 and 25. By this means a variable speed transmission is furnished for the endless conveyer. Any suitable device which will accomplish this purpose may be used. By means of this device power is transmitted to the shaft 26 which shaft is journaled in bearings 27 and 28 located in cross frames 16 and 17. Bevel gear 29 is keyed to shaft 26 and drives bevel gear 30 which is integral with bevel gear 31, both being loose on shaft 32. The worm wheel 33 is rotatably mounted upon shaft 32 and is provided with the hub 34 and the lugs 35 and 36. The short shafts 37 and 38 are mounted in said hub 34 and lugs 35 and 36. Rotatably mounted on these short shafts are the idler gears 39 and 40 which mesh with the gear 31 and drive bevel gear 41. Bevel gear 41 is keyed to shaft 32 and drives the same. Shaft 32 is rotatably mounted in bearings 42 and 43 located in the side frame 1—1. Spur gear 44 is keyed to shaft 32 and drives spur gear 45 which is keyed to shaft 46, which is rotatably mounted in journals 47 and 48, located in the side frames 1—1. Spur gear 49 is keyed to shaft 46 and drives spur gear 50 which is loosely mounted upon shaft 51. Shaft 51 is rotatably mounted in bearings 122 and 123 located in the frames of the machine. Integral with said spur gear 50 is the annular ring 52. This ring 52 is located on one side of the spur gear 50 and is provided with a plurality of notches 53 cut in its periphery of equal spacing. Adjacent to spur gear 50 upon said shaft 51 the segmental disk 54 is located. Through its hub 55 the said segmental disk is keyed to shaft 51 by the key 56. The housing 57 is secured to said segmental disk 54 by means of screws. Said housing carries a plunger 58 which is provided with the angular projection 59 arranged to engage the notches 53 of the ring 52. Said plunger is slidably mounted in said housing 57 and is provided with a laterally extending portion 60 which carries a roller 61. A bell crank lever 62 is pivotally mounted upon the segmental disk 54 by the stud 63. Said bell crank lever is provided with an oval shaped slot 64 which fits over the roller 61. Attached to said bell crank lever at one end is a rod 65 which penetrates the lug 66. Said rod is secured to said bell crank lever by means of the rivet 67 and said lug is rigidly secured to the segmental disk in any suitable manner. A coil spring 68 surrounds said rod 65 and is held in compression against said lug 66 by the washer 69 and cotter pin 70. The bell crank lever is also provided with a roller 71 rotatably mounted upon the stud 72. Cam plates 73 and 74 are screwed to the segmental disk and between them is provided the race way 75. The spur gear 49 has the plate 76 secured to it which carries the roller 77 rotatably mounted on the stud 78. This plate 76 is provided with cam edge 79 which engages the roller 71 and operates the bell crank lever. The roller 77 travels in the cam race 75, being fitted to engage the cam edges of the cam plates 73 and 74. When the plunger 58 engages a notch 53 of the ring 52 the segmental disk 54 is locked to the gear 50 and the shaft 51 is normally driven by means thereof. Such arrangement is illustrated by Fig. 5.

When however the cam 79 engages the roller 71 the bell crank lever is actuated and the plunger 58 is moved longitudinally against the pressure of the spring 68 until its angle projection 59 disengages the notch 53. At this juncture the segmental disk is disconnected from the gear 50 and the roller 77 enters the cam race 75. This arrangement is illustrated in Fig. 6. From this point until the roller passes out of the cam race 75 as shown in Fig. 8 the shaft 51 will be driven by the roller 77 through the segmental disk and during this interval the velocity of said shaft 51 will be accelerated. Also during this interval the plunger will have traveled at sufficiently higher velocity than the gear 50 to enable it to move forward one notch. So, before the roller 77 leaves the cam race the plunger 58 will have engaged a preceding notch in the ring 52 and is prepared to drive the shaft 51. It will be noted that during its normal operation the gear 50 drives the shaft 51 by means of the plunger 58, the notch 53, the segmental disk 54 and the key 56 and, that while the pan skip operation is taking place the gear 50 ceases to drive the shaft 51 and the roller 77 drives the shaft 51 directly through the cam race 75 and the segmental disk 54 at an accelerated velocity, thereby effecting the pan skip operation.

The operation of the pan skipping mechanism is shown in different stages of its progress by Figs. 5, 6, 7 and 8. Fig. 5 shows the relative positions of the parts making up the pan skip mechanism just before the pan skip operation takes place. Fig. 6 shows the same parts just after the plunger 58 is unlocked from the notch 53 and the pan skip operation is starting. Fig. 7 shows the same parts in the midst of the pan skip operation. It will be noted in this figure that in the middle of the pan skip operation the roller 77 is on a straight line between shafts 46 and 51. Fig. 8 shows the same parts just as the pan skip operation is finished and roller 77 is leaving the cam race 75.

Bevel gear 80 is keyed to shaft 51 and drives bevel gear 81 through the idler gears 82 and 83. Worm wheel 84 is similar in construction to worm wheel 33 hereinbefore described and is provided with lugs 85 and 86 and a hub 87. Said worm wheel 84 is loosely mounted upon shaft 51 and is capable of rotation thereon. Bevel gear 81 is loosely mounted upon shaft 51 and is integral with sprocket wheel 88 which drives sprocket wheel 89 by means of the chain 90. Sprocket wheel 89 is keyed to shaft 91 which is rotatably journaled in bearings 92 and 93. Shaft 91 also carries sprocket wheels 94 and 95 keyed to it. Shaft 96 is rotatably journaled in bearings 97 and 98 and carries sprocket wheels 99 and 100. Suitable sprocket chains 101 and 102 are carried by sprockets 95 and 99 and 94 and 100 respectively. These chains are provided with upwardly projecting dogs 103. 104 represents a vertically reciprocating cutter head suitable for carrying cutting dies for the purpose of forming crackers or biscuits upon the apron 105. The apron moves in the direction of the arrow and delivers the cut cracker forms onto pans at the knife edge 106. At this point the cracker forms fall off the apron onto the pans and are properly spaced thereon by the mechanism hereinbefore described. The apron 105 is carried over rollers 107, 108, 109 and 110 and is continuous and is driven in any suitable manner from the part of the machine not shown.

The worm wheels 33 and 84 are connected by the shaft 112 carrying worms 113 and 114 keyed to said shaft. Worm 113 meshes with worm wheel 33 and worm 114 meshes with worm wheel 84. Shaft 112 is rotatably journaled in bearings 115 and 116 which are joined to the frame of the machine. Bevel gear 117 is keyed to shaft 112 and meshes in bevel gear 118 which is keyed to shaft 119. Shaft 119 is rotatably journaled in bearings 120—120 located in the frame of the machine. A hand wheel 121 is secured to shaft 119.

In the operation of the machine cracker dough in sheet form is conveyed through the machine upon the apron 105 and as it passes beneath the cutter head it is cut into cracker blanks or forms by the dies held by the cutter head and after this the blanks are carried along upon the apron until they reach the knife edge 106 where they fall upon pans beneath. These pans are carried by the chains 101 and 102 between the dogs 103. After the last row of crackers is deposited upon a pan the velocity of the pan is automatically accelerated in order that the next row of crackers may be safely deposited upon the succeeding pan and not between the pans. This is accomplished by the pan skipping mechanism illustrated in Figs. 5, 6, 7 and 8.

When the pan skip operation takes place it is necessary that a pan end be passing under the knife edge 106. To bring about this conjunction of operations means are provided for adjusting the pans to cause them to register with the pan skip operation. This means consists of the worm wheels 33 and 84, worms 113 and 114, shafts 112 and 119 and the bevel gears 31, 39, 40 and 41 coöperating with worm wheel 33 and bevel gears 80, 81, 82 and 83 coöperating with worm wheel 84 and hand wheel 121. By this means turning the hand wheel 121 will either accelerate or retard the velocity of the pan skipping gears and at the same time the velocity of the panning chains 101 and 102 will not be changed. Consequently, by this means the relationship between the pan skip and the panning chains may be changed while the machine is in motion to bring about proper registration of the pan skip, the pan ends and the knife edge.

Having described my invention what I claim and desire to secure by Letters Patent is:

1. In a cracker cutting machine a gear wheel rotatably mounted on a shaft and driven by a second gear, a rotating member secured to said shaft adjacent to said driven gear, means for locking the rotating member to the driven gear during part of each rotation thereof and for severing their connection during the remainder of each rotation, and a rotating arm for transmitting motion to said rotating member during the interval in which it is disconnected from said driven gear.

2. In a cracker cutting machine a gear wheel loosely mounted upon a shaft and driven by a second gear wheel, a rotating member secured to said shaft, means whereby the said shaft is driven through said gears and rotating member during a part of each rotation thereof and means for releasing said rotating member from said gears during the remainder of each rotation thereof and a rotating arm for driving said rotating member at an accelerated velocity during its period of release.

3. A pan skipping device for cracker cutting machines composed of a gear wheel loosely mounted upon a shaft and driven by a second gear wheel, a ring attached to said loose gear having a plurality of notches of equal spacing, a rotating member secured to said shaft, a plunger mounted upon said rotating member for engaging the notches of said ring and thereby locking said driven gear to said rotating member, means for unlocking said rotating member and advancing the plunger to engage a preceding notch in said ring while the same is unlocked.

DANIEL K. ALLISON.

Witnesses:
 THEO. L. HOFFMAN,
 EDWARD BETZ.